United States Patent [19]

Kanda et al.

[11] Patent Number: 4,607,099

[45] Date of Patent: Aug. 19, 1986

[54] STABILIZATION OF XANTHAN GUM IN AQUEOUS SOLUTION

[75] Inventors: Shoichi Kanda; Jun Hosoda; Zengiro Kawamura, all of Kanagawa, Japan

[73] Assignee: Nitto Chemical Industry Co., Ltd., Tokyo, Japan

[21] Appl. No.: 677,280

[22] Filed: Dec. 3, 1984

[30] Foreign Application Priority Data

Dec. 1, 1983 [JP] Japan ................................ 58-225404

[51] Int. Cl.[4] ........................ C08B 37/00; C09K 3/00; C09K 15/26

[52] U.S. Cl. ................................ 536/114; 252/8.554; 252/402

[58] Field of Search .................. 536/114; 252/8.55 D, 252/402; 548/305

[56] References Cited

U.S. PATENT DOCUMENTS

| | | | |
|---|---|---|---|
| 2,642,396 | 6/1953 | Roddy, Jr. | 548/305 X |
| 4,318,815 | 3/1982 | Tyler | 536/114 X |
| 4,393,163 | 7/1983 | Kanda et al. | 524/608 |
| 4,452,639 | 6/1984 | Kohn | 536/114 X |
| 4,469,620 | 9/1984 | Kohn | 536/114 X |
| 4,481,316 | 11/1984 | Kanda et al. | 524/93 |

FOREIGN PATENT DOCUMENTS

| | | | |
|---|---|---|---|
| 2912110 | 12/1970 | Fed. Rep. of Germany | 536/114 |

*Primary Examiner*—John F. Terapane
*Assistant Examiner*—Matthew A. Thexton
*Attorney, Agent, or Firm*—Sughrue, Mion, Zinn, Macpeak, and Seas

[57] ABSTRACT

A method of stabilizing an aqueous solution of xanthan gum is described, comprising incorporating at least one stabilizing agent selected from the group consisting of 2-mercaptobenzimidazole and derivatives thereof in an aqueous solution of xanthan gum.

6 Claims, No Drawings

STABILIZATION OF XANTHAN GUM IN AQUEOUS SOLUTION

FIELD OF THE INVENTION

This invention relates to a method of stabilizing xanthan gum, such as xanthan gum produced in a liquid nutrient medium by the action of a microorganism belonging to the genus Xanthomonas, in aqueous solution.

BACKGROUND OF THE INVENTION

Xanthan gum is used widely in a number of industrial fields such as in oil-well drilling, in the ceramic industry, and in the paint industry. However, its performance characteristics can deteriorate even during storage at room temperature; such tendency becomes significant at higher temperatures and, in extreme cases, the use thereof for the intended purpose becomes impossible.

For example, in the case of petroleum recovery from an underground oil stratum by introducing under pressure an aqueous solution of xanthan gum, the oil stratum temperature generally reaches about 40° to 100° C. and the aqueous xanthan gum solution injected stays in the underground oil stratum from the injection well to the production well for a long period of time, for example several months to several scores of months. Therefore, guarantee of the quality of xanthan gum during such stay period is required. Xanthan gum is also used widely as a modifier for the mud-laden fluid for mud drilling in searching for petroleum. However, as a result of the increase in the depth of drilling in recent years, the stratum temperature reaches 90° C. or higher, so that xanthan gum is decomposed and loses its function as a modifier for the mud-laden fluid, possibly leading to serious difficulties in drilling operations. For xanthan gum to fully achieve the intended purpose of its use, it is necessary to minimize the change in quality of xanthan gum in the above temperature range.

SUMMARY OF THE INVENTION

The present inventors have conducted extensive and intensive studies on the stabilization of xanthan gum in aqueous solution and on additives for such stabilization, and, as a result, found that the incorporation of 2-mercaptobenzimidazole and certain derivatives thereof can substantially inhibit the decomposition of the xanthan gum. This finding has now led to the present invention.

Thus, the present invention is directed to a method of stabilizing xanthan gum in aqueous solution comprising incorporating in an aqueous solution of xanthan gum at least one member selected from the group consisting of 2-mercaptobenzimidazole and derivatives thereof.

DETAILED DESCRIPTION OF THE INVENTION

The 2-mercaptobenzimidazole and derivatives thereof to be used in stabilizing xanthan gum in accordance with the present invention are represented by formula (I)

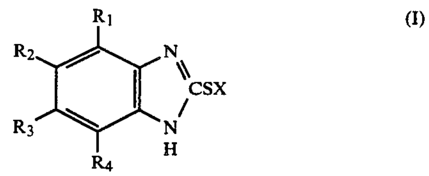

(I)

wherein $R^1$, $R^2$, $R^3$ and $R^4$ each represents hydrogen, methyl, or ethyl, and X represents hydrogen, alkali metal, or ammonium.

Generally these compounds are used in the form of sodium salt, potassium salt, or ammonium salt, since they are poor in solubility when they are in the free form, namely X is hydrogen.

It is known that thiourea, 2-mercaptobenzimidazole, and derivatives thereof are effective in stabilizing aqueous solutions of acrylamide polymers, as described, e.g., in U.S. Pat. No. 3,235,523 and Japanese Patent Publication Nos. 47414/1983 and 48583/1983. On the other hand, it is known that thiourea is basically ineffective in the stabilization of aqueous xanthan gum solutions. It is well known in the art that a certain stabilizing agent which is effective in stabilizing some substances is not always effective in stabilizing other substances. This is presumably because the mechanisms of stabilization differ in various ways depending on the combination of the stabilizing agent and the substance to be stabilized.

Under these circumstances, the present invention has been completed based on the finding that the particular combination of 2-mercaptobenzimidazole or a derivative thereof and xanthan gum is very effective in the stabilization of aqueous xanthan gum solutions.

The terminology "xanthan gum" as used herein means a substance produced in liquid nutrient medium by a microorganism belonging to the genus Xanthomonas. Such substance is commercially available, for example, from Kelco, USA under the trademarks "Kelzan" and "Xanflood" and from Pfizer, USA under the trademarks "Flocon" and "Pfizer Xanthan Biopolymer". The aqueous xanthan gum solution bo be stabilized in accordance with this invention preferably has a concentration of from about 0.0001 to 10% by weight, and it is particularly preferred that the invention be applied to aqueous xanthan gum solutions within the concentration range of 0.0001 to 5% by weight.

The above-mentioned stabilizing agents may be used either alone, or if desired, in admixture of two or more thereof. Furthermore, they may also be used in combination with other known stabilizing agents. In accordance with the invention, the stabilizing agents are used in an amount of from 0.1 to 20 parts by weight per 100 parts by weight of xanthan gum, preferably 0.5 to 15 parts by weight, more preferably 1.0 to 10 parts by weight. Amounts less than 0.1 part by weight produce only poorer stabilizing effects, whereas addition in amounts exceeding 20 parts by weight produces little difference in the stabilizing effect as compared with the case where the level of addition is 20 parts by weight, and hence is unfavorable from the economical viewpoint.

In the practice of the invention, the stabilizing agent can be incorporated with the xanthan gum, for example, (1) by mixing the stabilizing agent in powder form with xanthan gum in powder form using a mixer blender, (2) by admixing the stabilizing agent in the form of powder or aqueous solution with a xanthan gum-containing fermentation broth, or (3) by adding the stabilizing agent in the form of powder or aqueous solution to an aqueous solution of xanthan gum with stirring.

With aqueous xanthan gum solutions stabilized in accordance with the invention, the stabilizing effect is manifested not only at room temperature but also at a temperature as high as 90° C. The stabilizing effect at high temperatures is particularly useful.

The kind of water to be used in preparing aqueous xanthan gum solutions may vary depending on the intended use of said solutions but is not critical. Thus, the water can be adequately selected from among seawater, ground water, river water, city water, industrial water, etc.

The following examples are further illustrative of the effect of the present invention.

EXAMPLE 1

In 1,000 g of deionized water, there was dissolved 5.0 g of Kelzan (trademark; Kelco's xanthan gum). The thus-prepared 0.5% aqueous solution had a viscosity of 2,410 cp (Brookfield viscometer No. 2 rotor, 6 rpm, 25° C.).

The above xanthan gum was dissolved in 3% aqueous sodium chloride solution to make 0.1% aqueous xanthan gum solution. The solution was adjusted to pH 9 and its viscosity (initial viscosity, Ao) was measured. Then, a specified amount (see Table 1) of sodium salt of 2-mercaptobenzimidazole (MBI-Na) was added and the resulting solution was heated in a glass ampul at 120° C. for 3 or 20 hours, followed by viscosity measurement (At). The change in viscosity with time was expressed in terms of percent viscosity loss (At/Ao×100). The results thus obtained are summarized in Table 1.

TABLE 1

| MBI-Na Addition Level (%)* | Viscosity Loss (%) | |
|---|---|---|
| | After 3 hours | After 20 hours |
| 0 | 22.3 | 90.3 |
| 0.5 | 7.3 | 75.0 |
| 2.0 | 2.7 | 29.1 |
| 5.0 | 2.0 | 18.6 |
| 7.5 | 1.1 | 12.5 |
| 15.0 | 0.9 | 8.2 |

*% by weight on the polymer basis (hereinafter the same shall apply)

EXAMPLE 2

The procedure of Example 1 was repeated except that sodium salt of methyl-substituted 2-mercaptobenzimidazole (the methyl group occurring on the benzene ring) (MMBI-Na) was used in place of MBI-Na used in Example 1. The results thus obtained are summarized in Table 2.

TABLE 2

| MBI-Na Addition Level (%) | Viscosity Loss (%) | |
|---|---|---|
| | After 3 hours | After 20 hours |
| 0 | 23.8 | 91.1 |
| 0.5 | 8.4 | 76.3 |
| 2.0 | 3.3 | 32.4 |
| 5.0 | 2.2 | 19.8 |
| 7.5 | 1.6 | 13.3 |
| 15.0 | 1.2 | 9.7 |

EXAMPLE 3

A 0.1% aqueous solution of xanthan gum was prepared by dissolving the same xanthan gum species as used in Example 1 in tap water, adjusted to a pH of 9.0 and, following addition of MBI-Na as in Example 1, subjected to heat treatment (90° C., 3 or 20 hours). Thereafter, the percent viscosity loss was determined. The results thus obtained are summarized in Table 3.

TABLE 3

| MBI-Na Addition Level (%) | Visually Loss (%) | |
|---|---|---|
| | After 3 hours | After 20 hours |
| 0 | 40.6 | 90.4 |
| 0.5 | 11.5 | 73.5 |
| 2.0 | 6.2 | 55.7 |
| 5.0 | 3.0 | 31.9 |
| 7.5 | 2.1 | 18.3 |
| 15.0 | 1.9 | 11.5 |

EXAMPLE 4

The procedure of Example 1 was repeated except that 2-mercaptobenzimidazole (MBI) was used in place of MBI-Na used in Example 1. The results obtained are summarized in Table 4.

TABLE 4

| MBI Addition Level (%) | Visually Loss (%) | |
|---|---|---|
| | After 3 hours | After 20 hours |
| 0 | 21.6 | 91.1 |
| 0.5 | 8.0 | 73.3 |
| 2.0 | 3.1 | 30.3 |
| 7.5 | 1.6 | 14.1 |

While the invention has been described in detail and with reference to specific embodiments thereof, it will be apparent to one skilled in the art that various changes and modifications can be made therein without departing from the spirit and scope thereof.

What is claimed is:

1. A method of stabilizing a aqueous solution of xanthan gum comprising incorporating at least one stabilizing agent selected from the group consisting of 2-mercaptobenzimidazole and derivatives thereof represented by the formula (I)

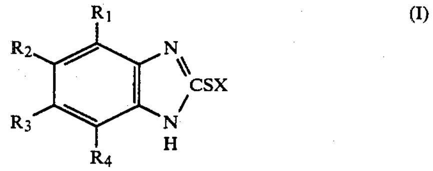

(I)

wherein $R^1$, $R^2$, $R^3$, and $R^4$ each represents hydrogen, methyl, or ethyl, and X represents hydrogen, alkali metal, or ammonium in an aqueous solution of xanthan gum.

2. A method as in claim 1, wherein the aqueous solution of xanthan gum has a xanthan gum concentration of from about 0.0001 to 10% by weight.

3. A method as in claim 2, wherein the stabilizing agent is used in an amount of from 0.1 to 20 parts by weight per 100 parts by weight of xanthan gum.

4. A method as in claim 1, wherein the stabilizing agent is used in an amount of from 0.1 to 20 parts by weight per 100 parts by weight of xanthan gum.

5. A method as in claim 1, wherein the aqueous solution of xanthan gum has a xanthan gum concentration of from about 0.0001 to 5% by weight.

6. A method as in claim 5, wherein the stabilizing agent is used in an amount of from 0.1 to 20 parts by weight per 100 parts by weight of xanthan gum.

* * * * *